(12) United States Patent
Mauborgne et al.

(10) Patent No.: US 11,815,646 B2
(45) Date of Patent: Nov. 14, 2023

(54) DRILLING FLUID ACTIVATION CORRECTION METHODOLOGY

(71) Applicant: Schlumberger Technology Corporation, Sugar Land, TX (US)

(72) Inventors: Marie-Laure Mauborgne, Sugar Land, TX (US); Christian Stoller, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 529 days.

(21) Appl. No.: 17/258,197

(22) PCT Filed: Jul. 8, 2019

(86) PCT No.: PCT/US2019/040792
§ 371 (c)(1),
(2) Date: Jan. 6, 2021

(87) PCT Pub. No.: WO2020/014116
PCT Pub. Date: Jan. 16, 2020

(65) Prior Publication Data
US 2021/0230954 A1 Jul. 29, 2021

Related U.S. Application Data

(60) Provisional application No. 62/695,227, filed on Jul. 9, 2018.

(51) Int. Cl.
*G01V 5/06* (2006.01)
(52) U.S. Cl.
CPC .................................... *G01V 5/06* (2013.01)

(58) Field of Classification Search
CPC .......... E21B 21/08; E21B 41/00; E21B 47/10; G01V 5/06; G01V 5/101
See application file for complete search history.

(56) References Cited

U.S. PATENT DOCUMENTS 5,459,314 A   10/1995 Plasek
7,081,616 B2   7/2006 Grau
(Continued)

FOREIGN PATENT DOCUMENTS

EP          0942296 A2    9/1999

OTHER PUBLICATIONS

International Search Report and Written Opinion issued in International Patent application PCT/US2019040792 dated Nov. 26, 2019, 13 pages.

*Primary Examiner* — David P Porta
*Assistant Examiner* — Mamadou Faye
(74) *Attorney, Agent, or Firm* — Jeffrey D. Frantz (57) ABSTRACT

A method for making natural gamma ray measurements of a subterranean formation includes causing a natural gamma ray sensor on an LWD tool to acquire a spectral gamma ray measurement while a neutron source emits neutrons. The measurements are evaluated to compute first and second drilling fluid activation corrections using corresponding first and second correction methodologies. The first and second corrections are processed to compute a third drilling fluid activation correction which is applied to the gamma ray measurements to compute a corrected total natural gamma ray measurement.

19 Claims, 7 Drawing Sheets

(56) References Cited

U.S. PATENT DOCUMENTS

| | | | |
|---|---|---|---|
| 2005/0127282 A1* | 6/2005 | Grau | ........................ G01T 1/40 |
| | | | 250/262 |
| 2015/0090870 A1 | 4/2015 | Stoller | |
| 2017/0363770 A1 | 12/2017 | Mauborgne et al. | |
| 2018/0059283 A1 | 3/2018 | Wang | |

* cited by examiner

DRILLING FLUID ACTIVATION CORRECTION METHODOLOGY

CROSS REFERENCE TO RELATED APPLICATIONS

This application claims the benefit of U.S. Provisional Application Ser. No. 62/695,227 entitled Error Reduction in the Oxygen Activation Correction, filed Jul. 9, 2018.

FIELD OF THE INVENTION

Disclosed embodiments relate generally to nuclear logging operations such as neutron and natural gamma ray logging and more specifically to a method of correcting natural gamma ray logs for measurement bias caused by drilling fluid (e.g., oxygen) activation induced gamma rays.

BACKGROUND INFORMATION

Natural gamma ray logging is one of the most common logging techniques in the oil and gas industry. Such logging operations measure the naturally occurring gamma radiation emitted by a subterranean formation, primarily from potassium, uranium, and thorium containing minerals in the formation. Both total gamma ray and spectral gamma ray sensors are commonly employed. Total gamma ray sensors measure the total number of detected gamma rays (e.g., with energy above one or more predetermined thresholds). Radioactive elements tend to concentrate in shales and clays, while clean sands and limestone formations tend to have low levels of natural radioactivity. A total gamma ray log indicates the shale content of a formation, with shale reading high radioactivity and sands and limestone reading low. Natural gamma ray logging is traditionally used for correlating zones from well to well, for preliminary identification of lithology, and for rough estimation of the volume of shale present in the formation. Spectral gamma ray sensors measure the energy spectrum of the emitted gamma rays and may be used to determine the weight concentrations of potassium, uranium, and thorium in the formation. This elemental analysis can provide a means to identify clay minerals, and help for the resolution of radioactive anomalies in clean formations that may be misinterpreted as shale zones using only a total gamma ray log.

In operations in which the tool string further includes a neutron source, such as a pulsed neutron generator, as is found in common nuclear logging tools, drilling fluids (mud) in the borehole may be activated by the emitted neutrons. Such activated mud is known to emit gamma rays that may be detected by a natural gamma ray sensor and thereby bias the natural gamma ray logging measurements. While methods are known for correcting natural gamma ray measurements for activated mud effects (e.g., activated oxygen gamma rays), there remains a need in the art for improved methods, for example, for reducing or minimizing error.

SUMMARY

A method for making a natural gamma ray measurement is disclosed. The method includes circulating drilling fluid through a logging while drilling string (or tool) deployed in a subterranean wellbore. The LWD string includes a neutron source and a natural gamma ray sensor. The gamma ray sensor acquires a spectral gamma ray measurement, for example, while the neutron source emits neutrons. The gamma ray measurements are evaluated to compute first and second drilling fluid activation corrections using corresponding first and second correction methodologies. These first and second drilling fluid activation corrections are processed to compute a third drilling fluid activation correction which is applied to the gamma ray measurements to compute a corrected total natural gamma ray measurement.

The disclosed embodiments may provide various technical advantages. For example, the disclosed methods may advantageously reduce the influence of drilling fluid activation induced by fast neutrons. The disclosed embodiments may provide corrected total natural gamma ray measurements that account for drilling fluid activation (e.g., oxygen activation) during a natural gamma ray logging operation and may therefore provide for an accurate determination of the total natural radioactivity in the subterranean formation. The correction methodology may improve both the accuracy and precision of total natural gamma ray measurements and therefore provide for improved formation evaluation.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
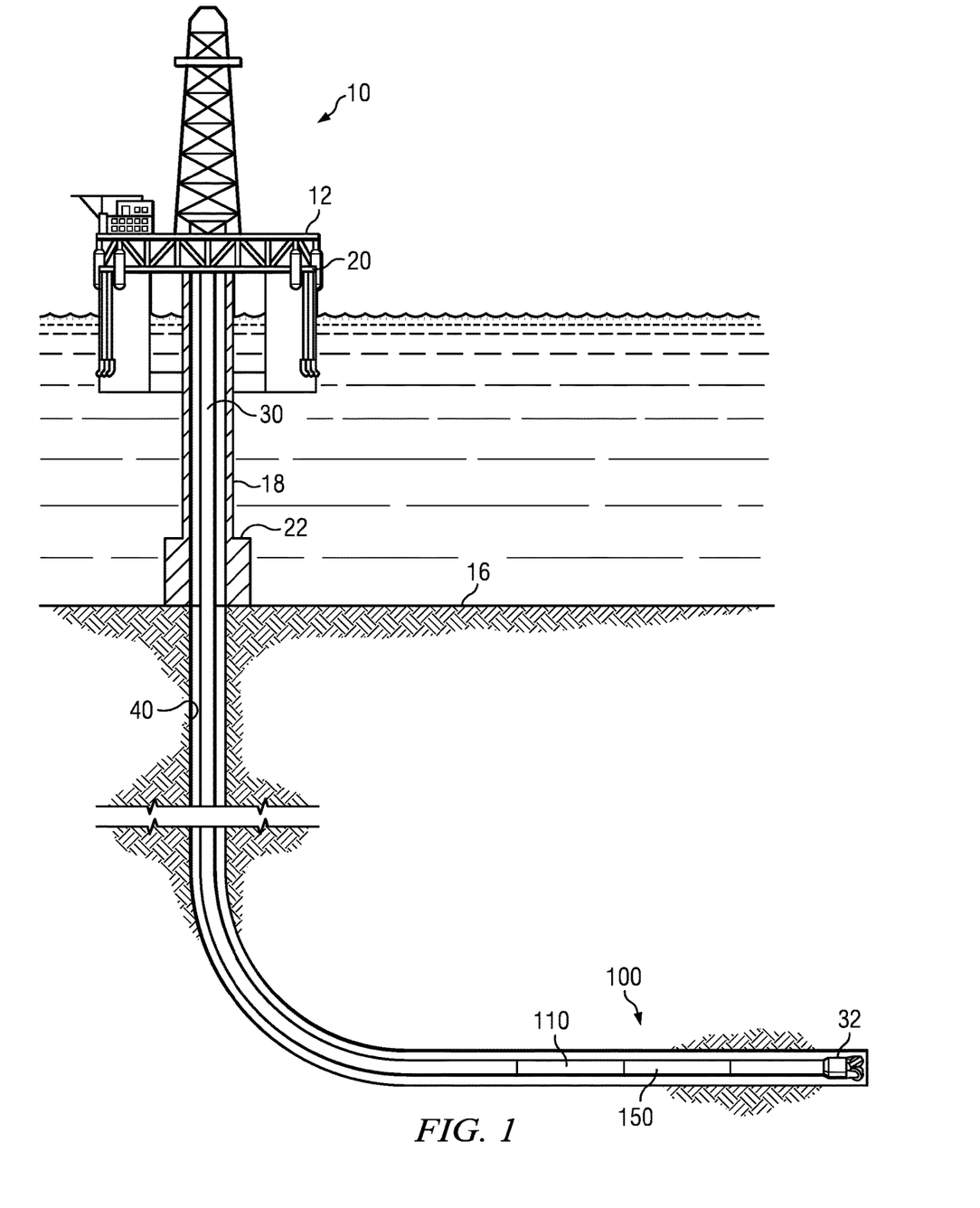
FIG. 1 depicts one example of a drilling rig on which disclosed logging string and logging method embodiments may be utilized.

FIG. 1 depicts one example embodiment of a nuclear logging string 100 in use in an offshore oil or gas drilling assembly, generally denoted 10. In FIG. 1, a semisubmersible drilling platform 12 is positioned over an oil or gas formation disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and the nuclear logging string 100. Embodiments of the nuclear logging string 100 include at least one neutron source and at least one gamma ray sensor. For example, in the depicted embodiment, logging string 100 includes a neutron logging tool 110 including a neutron source and a gamma ray logging tool 150 including a gamma ray sensor (of course the neutron source and gamma ray sensor may also be deployed in the same tool). Drill string 30 may further include, for example, a downhole drilling motor, a mud pulse telemetry system, a steering tool, and/or one or more of numerous other measurement while drilling (MWD) and logging while drilling (LWD) sensors for sensing downhole characteristics of the borehole and the surrounding formation. The disclosed embodiments are not limited in these regards.

It will be understood that the deployment depicted on FIG. 1 is merely an example for the purposes of describing the disclosed embodiments. It will be further understood that methods in accordance with the disclosed embodiments are not limited to use in offshore drilling operations, but are equally well suited for use with any kind of subterranean drilling operation, either offshore or onshore.

Figure 2A:
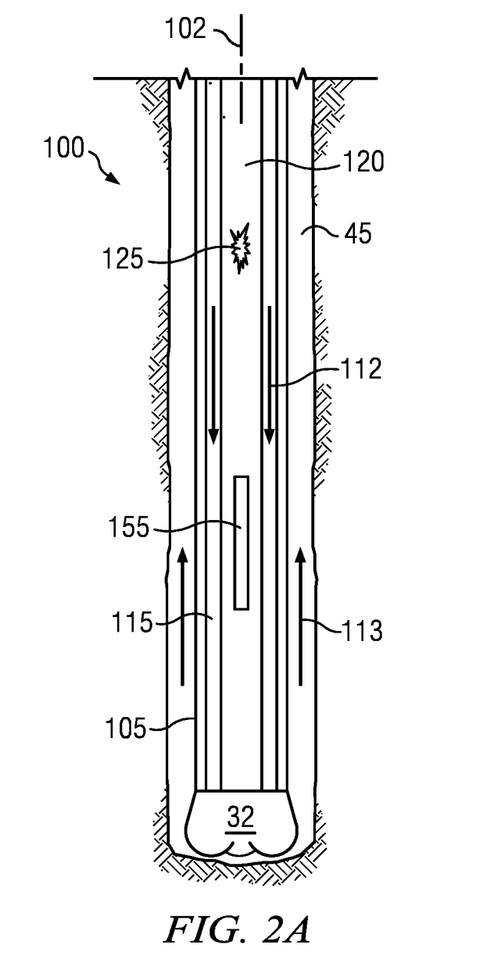
FIGS. 2A and 2B depict mandrel (2A) and chassis (2B) based embodiments of the nuclear logging string shown on FIG. 1.

FIGS. 2A and 2B depict mandrel (2A) and chassis (2B) based embodiments of nuclear logging string 100. In FIG. 2A logging string 100 includes a central mandrel 120 on which the neutron source 125 and the gamma ray sensor 155 are deployed. In the depicted embodiment, the mandrel 120 and the gamma ray detector 155 are substantially coaxial with a longitudinal axis 102 of the string 100. Drilling fluid is pumped downhole 112 through an annular flow channel 115 (radially between mandrel 120 and drill collar 105) to the bit 32 and flows upwards 113 through wellbore annulus 45.

Figure 2B:
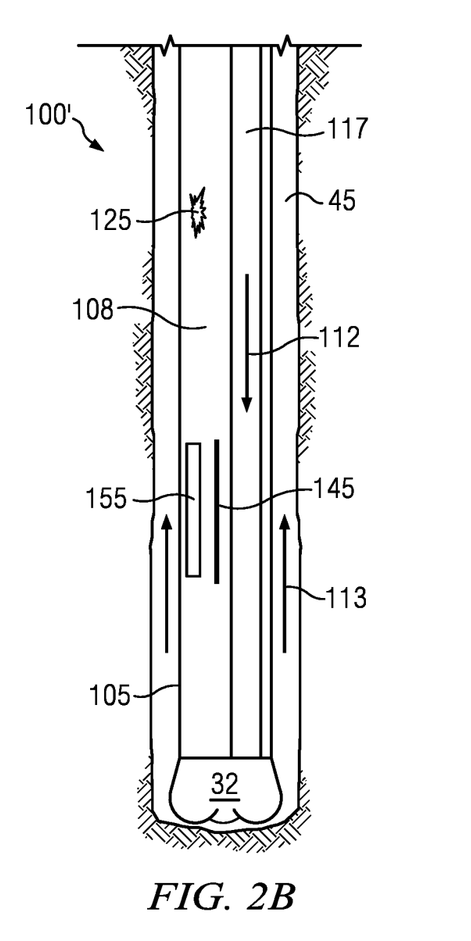

In FIG. 2B logging string 100' includes a neutron source 125 and a gamma ray sensor 155 deployed off axis in a drill collar 105 or tool chassis 108. Drilling fluid is pumped downhole 112 through an off axis channel 117 and flows upwards 113 through wellbore annulus 45. Optional shielding 145 may be provided between the gamma ray sensor 155 and the channel 117. As is known by those of ordinary skill, the gamma ray sensor 155 may include substantially any suitable gamma ray sensor, for example, including a sodium iodide (NaI) scintillator crystal and a photomultiplier.

With continued reference to FIGS. 2A and 2B, neutron source 125 may include substantially any suitable neutron source, for example, including a sealed chemical source or an electrical source. A suitable chemical source of neutrons may include an alpha-emitter mixed with beryllium such as the americium-241/beryllium chemical source. The neutron source 125 may also include the californium-252 chemical source. An electrical source may be substantially continuous or pulsed and may make use of the deuterium-tritium (d-T) nuclear reaction, the deuterium-deuterium (d-D) nuclear reaction, and/or the tritium-tritium (t-T) nuclear reaction for example. Pulsed neutron generators (PNG) that make use of the d-T nuclear reaction are well known and are commonly used to irradiate the subterranean formation with high energy neutrons (e.g., 14 MeV neutrons), for example, to provide a formation porosity map.

The gamma-ray sensor 155, while intended to measure the natural gamma-ray activity of the formation, may also detect gamma-rays that originate in the mud. During a nuclear logging operation high energy neutrons may activate elements in the drilling fluid (mud) as it passes by the neutron generator on the way to the bit. For example, the $^{16}O$ oxygen isotope may be activated to produce the $^{16}N$ nitrogen isotope, which decays back to $^{16}O$ with a half-life of about 7 seconds thereby resulting in the emission of a 6.13 MeV gamma ray. Such oxygen activation induced gamma rays may be detected when downwardly flowing mud 112 in the tool string and/or upwardly flowing mud 113 in the annulus emit gamma rays in the vicinity of the sensor 155. The resulting natural gamma ray measurements are thereby corrupted and commonly require correction to accurately reflect the properties of the formation.

Figure 3:
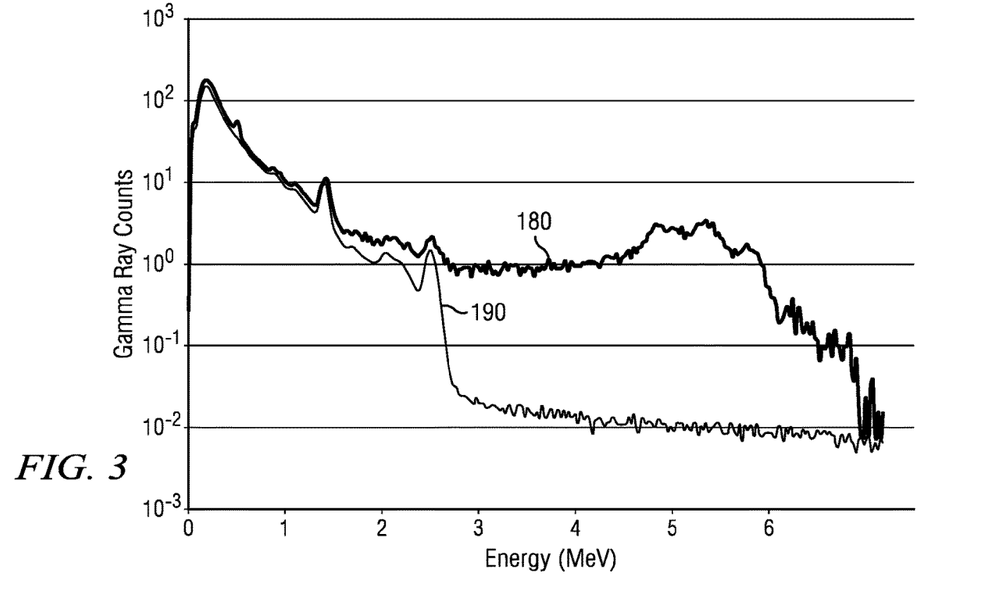
FIG. 3 depicts gamma ray spectra for a test granite formation with and without oxygen activation.

FIG. 3 depicts gamma ray spectra for a granite test formation with 180 and without 190 oxygen activation that illustrates the problem. The spectra are depicted as plots of gamma ray counts (or count rates) on the vertical axis versus energy on the horizontal axis (in units of MeV as indicated). It will be appreciated that the terms count and count rate in reference to gamma ray measurements are used interchangeably herein. Note that oxygen activation increases the received gamma ray counts, particularly at energies greater than about 1.5 MeV and most particularly at energies greater than about 3 MeV. In the depicted example, oxygen activation results in about a two-fold increase in the number of gamma rays having energies between about 1.5 and about 3 MeV and about a 100 times increase in the number of gamma rays having energies greater than about 3 MeV. It will thus be understood that oxygen activation can, in certain operational circumstances, have a significant impact on natural gamma ray logging measurements.

Commonly assigned U.S. Pat. No. 7,081,616, which is incorporated by reference in its entirety herein, discloses one approach for correcting natural gamma ray measurements. A correction count rate, corresponding to the gamma rays derived from mud activation, is determined based on the count rate above a predetermined threshold (e.g., above 3 MeV) and is subtracted from the total count rate. Assuming that the spectral shape of gamma rays induced by activated drilling fluid remains unchanged during the measurement, the number of counts above the threshold (referred to in the art as T4) is directly proportional to the total number of gamma rays induced by the activated drilling fluid (referred to in the art as T1). A ratio R=T1/T4 may be computed based on laboratory measurements and/or modelling of oxygen activation spectra. During a logging operation, the count rate above the threshold (e.g., above about 3 MeV) may be multiplied by R to determine the correction count rate which may then be subtracted from the total count rate. This correction methodology is commonly referred to in the art as a T1/T4 correction.

U.S. Patent Publication 2017/0363770, which is incorporated by reference in its entirety herein, extended the above approach by recognizing that drilling fluid activation spectra can be different for drilling fluid circulating inside and outside the logging tool. The method therefore disclosed computing R ratios for drilling fluid circulating inside and outside the logging tool (based modelling and/or on laboratory generated gamma ray spectra measured from activated mud circulating inside and outside a logging tool) and applying multiple corrections to the natural gamma ray measurements.

Another common approach for correcting natural gamma ray measurements includes determining one or more standard spectra for gamma rays emitted by activated mud (e.g., by oxygen activation). The measured gamma-ray spectrum may then be analyzed as a combination of the standard spectra of the elements of the formation generating natural gamma-rays (e.g., potassium, uranium, and thorium) as well as the one or more standard spectra of the mud activation. From this analysis, it is possible to derive the part of the spectrum due to the mud activation and to correct the total count rate measured by the gamma ray sensor by subtracting the count rate due to the detection of gamma rays from activated mud.

While the above described correction methods are serviceable, they can be prone to error. For example, the relative contribution of mud based gamma rays can vary during a logging operation. Moreover, the relative contribution of the mud activation gamma rays emitted by mud circulating inside and outside the logging tool may change over the course of logging operation such that using an average R can lead to correction errors.

Figure 4:
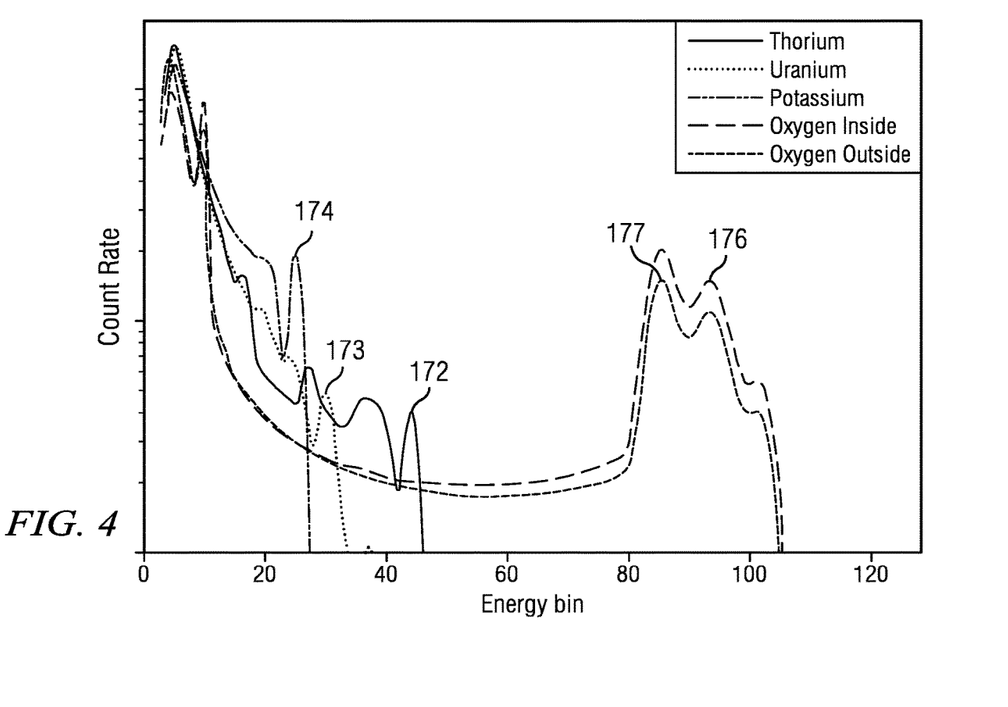
FIG. 4 depicts example standard spectra that may be used in spectral processing to determine the contribution of each spectrum to the measurement.

FIG. 4 depicts example standard spectra that may be used in spectral processing to determine the contribution of each spectrum to the measurement. The example spectra include thorium 172, uranium 173, potassium 174, oxygen activation inside the logging tool 176 (i.e., emitted in the flow channel) and oxygen activation outside the logging tool 177 (i.e., emitted in the annulus).

As known to those of ordinary skill in the art, natural gamma ray logging operations generally measure low count rates, for example, on the order of 1 to 100 counts per second emitted by the formation and 1-50 counts per second emitted by activated drilling fluid. Logging while drilling acquisition frames are commonly a few seconds in duration (e.g., 4 seconds) such that the total number of counts per acquisition frame may be very low. The resulting measured spectrum can be very sparse and difficult to fit.

Figure 5A:
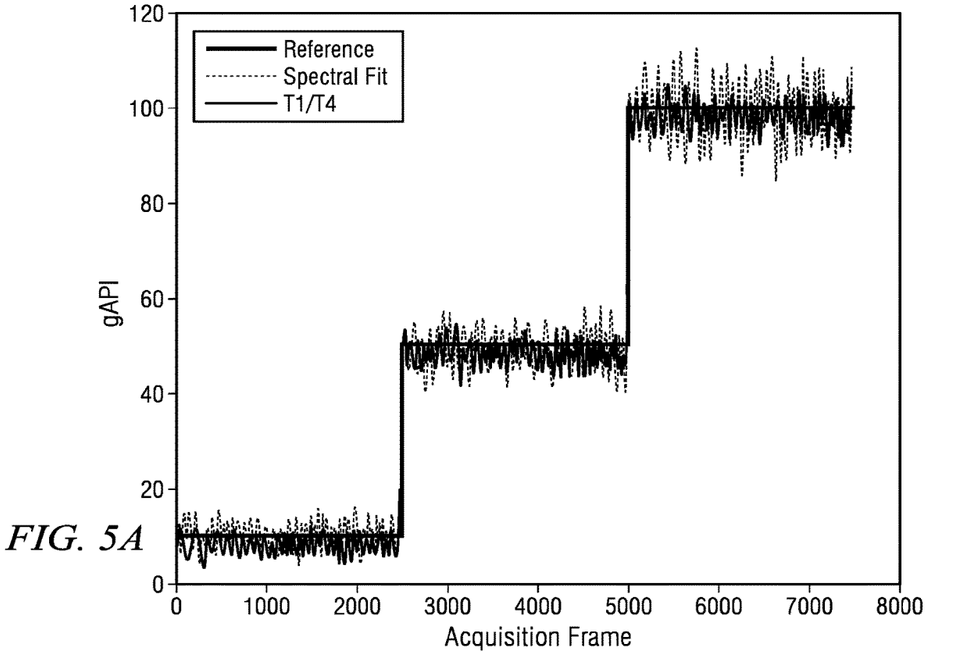
FIGS. 5A and 5B depict plots of formation activity versus acquisition frame for a hypothetical natural gamma ray logging operation.
Figure 5B:
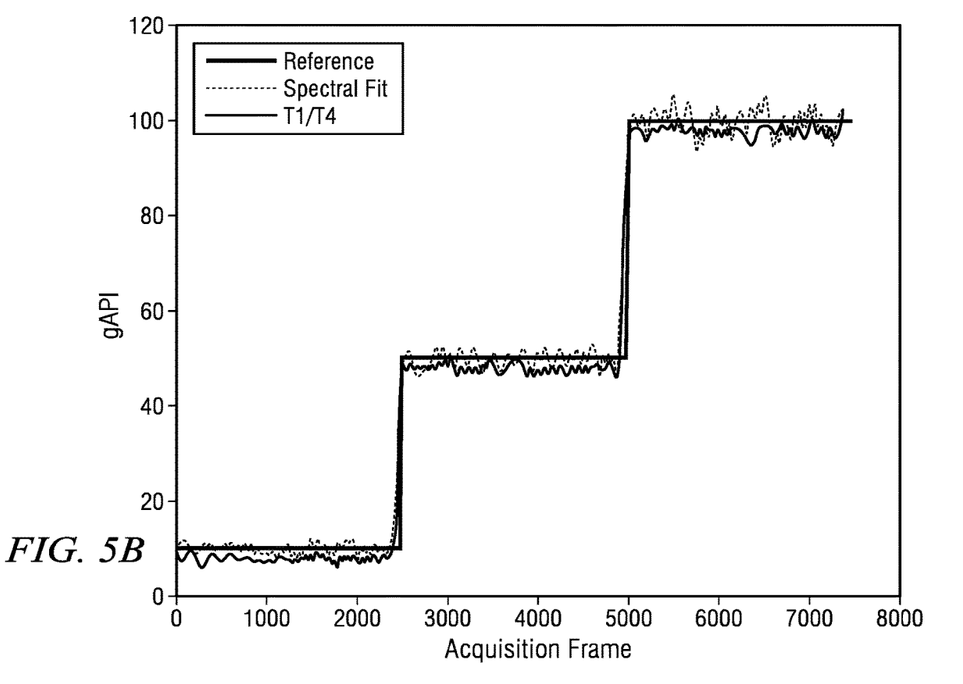

FIGS. 5A and 5B depict plots of formation activity (in units of gAPI) versus acquisition frame for a hypothetical natural gamma ray logging operation. In this hypothetical operation, the reference natural formation activity is 10 for the first 2500 frames, 50 for the second 2500 frames (frames 2501 to 5000) and 100 for the third 2500 frames (5001 to 7500). In FIGS. 5A and 5B, the gamma ray data are corrected using correspondingly distinct first and second methods: (i) a conventional T1/T4 correction in which the R was determined via modelling and/or laboratory measurements and (ii) spectral fitting using the five standard spectra depicted on FIG. 4. In FIG. 5A, the natural gamma ray data are accumulated (averaged) over 20 frames prior to correction while in FIG. 5B, the data are accumulated (averaged) over 100 frames prior to correction.

With continued reference to FIGS. 5A and 5B, it can be seen that the T1/T4 correction methodology results in a bias of several gAPI. The spectral fitting correction methodology is particularly noisy, with the noise increasing with increasing formation activity. Comparing FIGS. 5A and 5B shows that increasing the accumulation of frames before correction improves the statistics (and therefore significantly reduces noise) however at the expense of degrading vertical resolution. Moreover, increasing the number of frames was not observed to improve accuracy (remove bias).

Figure 6:
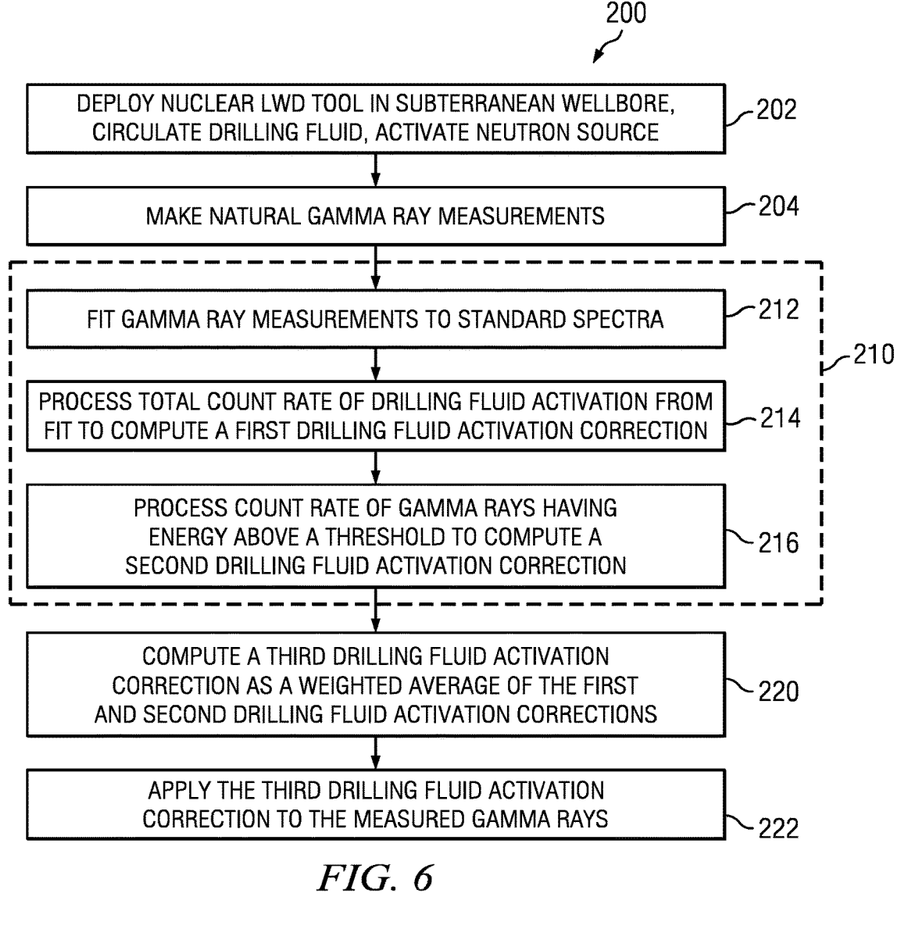
FIG. 6 depicts a flow chart of one disclosed method embodiment.

FIG. 6 depicts a flow chart of one disclosed method embodiment 200. An LWD tool string including a neutron source and a gamma ray sensor is deployed in a subterranean wellbore at 202 (e.g., as depicted in FIG. 1). Drilling fluid is circulated through the LWD string (e.g., during a drilling operation) and the neutron source is activated and thereby emits high energy neutrons into the wellbore (and surrounding formation). Spectral gamma ray measurements are made at 204, for example, while the neutron source is activated in 202. The spectral gamma ray measurements made in 204 are processed at 210 using first and second correction methodologies to determine a drilling fluid activation correction. Spectral contributions of the gamma ray measurements are obtained by fitting the measurements to standard spectra at 212, wherein at least one of the standard spectra is an oxygen activation spectrum. The total count rate of oxygen activation gamma rays is determined for a first time interval based on the fit in 212 and is processed to compute a first drilling fluid (e.g., oxygen) activation correction at 214. A count rate of the measured gamma rays in an energy window above one or more energy thresholds (e.g., the T4 count rate) is determined for a second time interval and is processed to compute a second drilling fluid activation correction at 216. A third drilling fluid activation correction is computed at 220 as a weighted average of the first and second drilling fluid activation corrections. This third drilling fluid activation correction may be applied to the measured gamma rays at 222 to obtain a corrected total natural gamma ray measurement.

Figure 7:
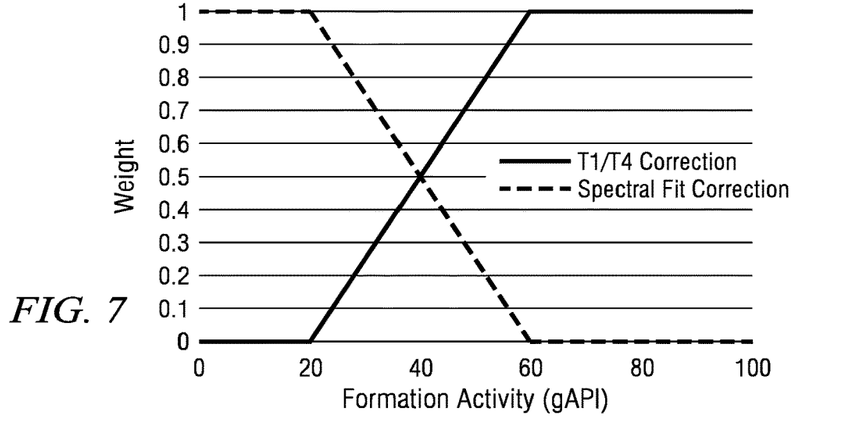
FIG. 7 depicts an example linear weighting function suitable for use with the method shown on FIG. 6.

With continued reference to FIG. 6, it will be understood that in certain embodiments method 200 may be thought of as a method for computing a weighted average of a first correction obtained using the spectral fitting correction methodology over a first measurement interval and a second correction obtained using the T1/T4 correction methodology over a second measurement interval to compute a third correction (the weighted average). Substantially any weighting function may be used. For example, FIG. 7 shows a linear weighting function that is dependent on the formation activity (in units of gAPI). In the example shown on FIG. 7, the weighted average is biased towards the T1/T4 correction methodology at relatively higher formation activity (as indicated by higher measured count rates) and towards the spectral fitting correction methodology at relatively lower formation activity. In such an embodiment, the weighting function may be selected adaptively based on the measured count rates in 204.

It will be understood that the drilling fluid activation correction in method 200 may be computed and applied at each acquisition frame of the gamma ray measurements made in 204 (e.g., at 4 second intervals). For example, the first drilling fluid activation correction may be computed in 214 by fitting the gamma ray measurements acquired in a first time interval (a first measurement window) about the acquisition frame to the standard spectra. Likewise, the second drilling fluid activation correction may be computed in 216 by determining a T4 count rate of the gamma ray measurements acquired in a second time interval (a second measurement window) about the acquisition frame. The third drilling fluid activation correction may then be obtained in 218 by computing the weighted average of the first and second drilling fluid activation corrections. The corrected total natural gamma ray measurement may then be computed acquisition frame by acquisition frame in 220 and may be thought of as a moving average with the degree of smoothing (averaging) depending on the length of the first and second time intervals.

The first and second measurement intervals (windows) may be substantially any suitable time intervals appropriate for making gamma ray logging measurements. For example only, each of these time intervals may be in a range from about 4 to about 200 seconds (e.g., from about 1 to about 50 acquisition frames when an acquisition frame is 4 seconds in duration). In certain embodiments, the first time interval may be longer than the second time interval (i.e., the time interval or window over which the spectral fitting correction methodology is applied may be longer than the time interval over which the T1/T4 correction methodology is applied). Moreover, the length of the first or second time interval may be determined adaptively, for example, when the total number of gamma ray counts above the energy threshold reaches a predetermined value.

With continue reference to FIG. 6, the spectral fitting correction methodology may advantageously utilize at least five standard spectra including thorium, uranium, and potassium natural gamma ray spectra and first and second oxygen activation spectra representative of activation from drilling fluid inside the logging tool and outside the logging tool (e.g., as depicted on FIG. 4). Additional standard spectra, for example, for drilling fluid activation inside and outside the logging tool may also be utilized to identify other isotopes in the activated drilling fluid, for example, including $^{23}$Na, $^{27}$Al, $^{28}$Si, and $^{133}$Ba. Contributions from these isotopes may be added the oxygen activation counts to determine a total count rate of the correction.

Figure 8:
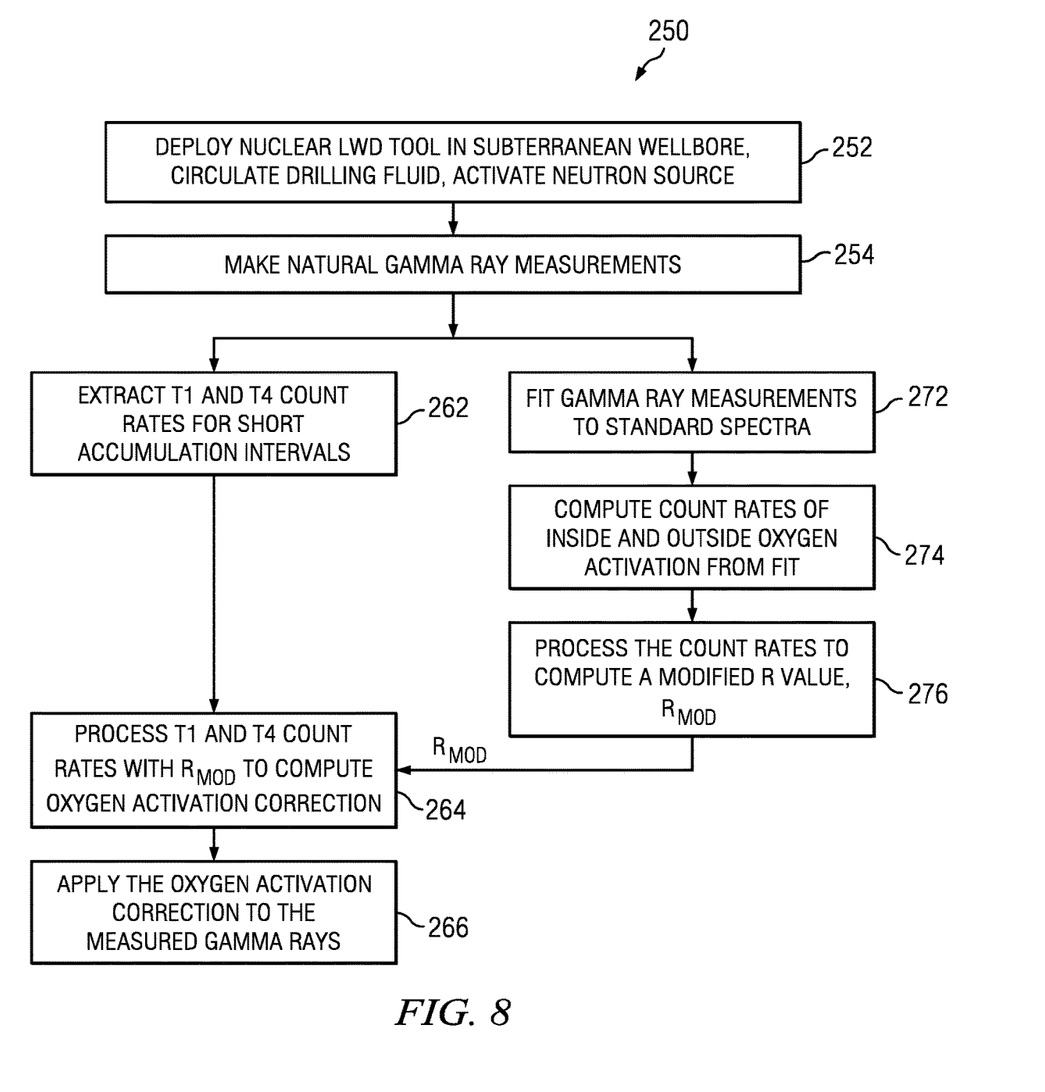
FIG. 8 depicts a flow chart of another disclosed method embodiment.

FIG. 8 depicts a flow chart of another disclosed method embodiment 250. An LWD tool string including a neutron source and a gamma ray sensor is deployed in a subterranean wellbore at 252 (e.g., as depicted in FIG. 1). Drilling fluid is circulated through the LWD string (e.g., during a drilling operation) and the neutron source is activated and thereby emits high energy neutrons into the wellbore (and surrounding formation). A gamma ray spectrum is measured at 254 using a natural gamma ray sensor. Method 250 is similar to method 200 in that the correction is based on a combination of a spectral fitting correction methodology and a T1/T4 or similar correction methodology. Method 250 differs from method 200 in that it does not involve computing a weighted average of the corrections, but rather a weighted average of at least two R values for use in a T1/T4 correction methodology (or a similar correction methodology in which count rates above one or more thresholds is processed to obtain the correction).

With continued reference to FIG. 8, method 250 employs first and second parallel processing paths 260 and 270. In the first path 260, the gamma ray measurements are evaluated over relatively short accumulation intervals (e.g., time intervals ranging from about 4 to about 160 seconds depending on the observed count rates in 254). At 262 T1 and T4 count rates are extracted for each of a plurality of the relatively short accumulation intervals. These T1 and T4 count rates are processed at 264 in combination with a modified R value (which is obtained from the second path 270 as described in more detail below) to compute an oxygen activation correction. The oxygen activation correction is applied to the gamma ray measurements in the corresponding interval at 266 to obtain corrected total natural gamma ray measurements. The total natural gamma ray measurements may be further evaluated, for example, to provide well to well correlation of formation layers within a field, to distinguish between shale and radioactively clean layers, identify formation lithology, and/or estimate a volume of shale present in the formation.

In the second path 270, the gamma ray measurements are evaluated over relatively longer accumulation intervals (e.g., time intervals ranging from about 20 to about 800 seconds depending on the observed count rates in 254). At 272 spectral the gamma ray measurements in each of the longer accumulation intervals is fit to standard spectra including at least first and second oxygen activation spectra corresponding to the contributions of the oxygen activation gamma rays emitted by mud circulating inside and outside the logging tool. For example, the fitting at 272 may utilize the five spectra depicted on FIG. 4. The inside and outside contributions (count rates) of oxygen activation gamma rays may be computed at 274 based on the fit obtained in 272. The modified R value may be computed at 276 based on the inside and outside contributions computed in 274 and applied at 264 as described above. The modified R value may be computed, for example, according to the following equation:

$$R_{mod} = R_{in}\frac{Y_{in}}{Y_{in} + Y_{out}} + R_{out}\frac{Y_{out}}{Y_{in} + Y_{out}}$$

where $R_{mod}$ represents the modified R value, $R_{in}$ and $R_{out}$ represent inside and outside ratios (R values) based on laboratory measurements or modeling results of corresponding inside and outside oxygen activation spectra (where inside and outside refer to ratios determined based on activated drilling fluid circulating inside and outside the logging tool), and $Y_{in}$ and $Y_{out}$ refer to inside and outside contributions of oxygen activation gamma rays computed at 274. With continued reference to the above equation, it will be understood that $R_{mod}$ represents a weighted average of $R_{in}$ and $R_{out}$ based on the relative contributions of $Y_{in}$ and $Y_{out}$.

As described above with respect to FIG. 6, the lengths of the first and/or second accumulation intervals may be determined adaptively, for example, when the total number of gamma ray counts above the energy threshold reaches corresponding predetermined values.

Figure 9:
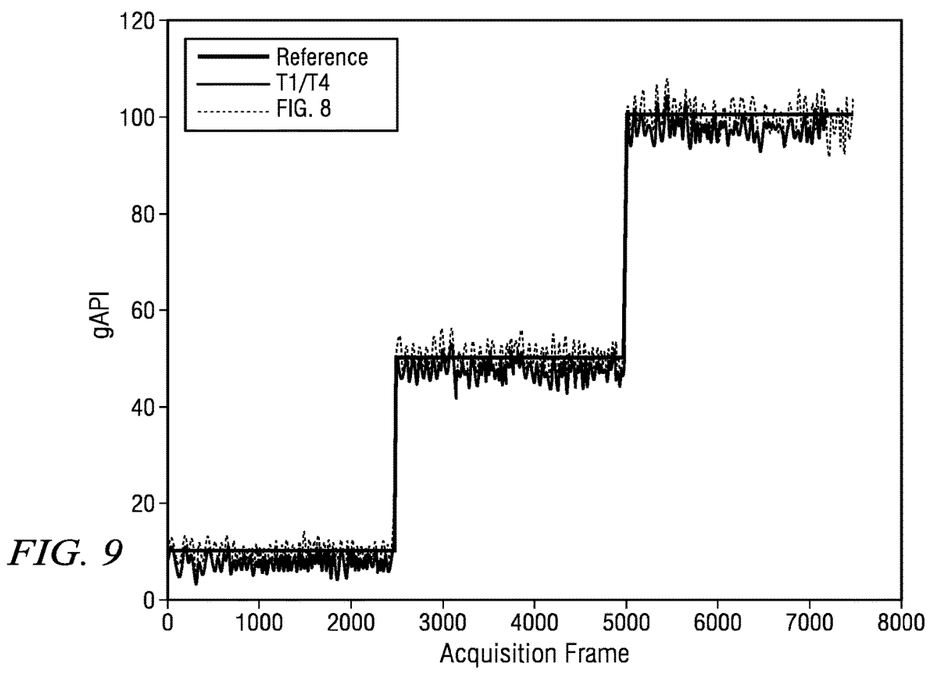
FIG. 9 depicts a plot of formation activity versus acquisition frame for a hypothetical natural gamma ray logging operation demonstrating the improved accuracy of the method shown on FIG. 8.

FIG. 9 depicts a plot of formation activity (in units of gAPI) versus acquisition frame for a hypothetical natural gamma ray logging operation. As with the plots depicted on FIGS. 5A and 5B, the reference natural formation activity is 10 for the first 2500 frames, 50 for the second 2500 frames (frames 2501 to 5000) and 100 for the third 2500 frames (5001 to 7500). In FIG. 9, the gamma ray data are corrected using the method described above with respect to FIG. 8. The relatively short accumulation in the first path was 20 frames while the relatively longer accumulation in the second path was 100 frames. The correction is compared to the T1/T4 correction methodology shown on FIG. 5A. As is readily apparent, the correction methodology described above with respect to FIG. 8 improved the accuracy (eliminated the bias/error) without sacrificing precision (noise or vertical resolution).

Figure 10:
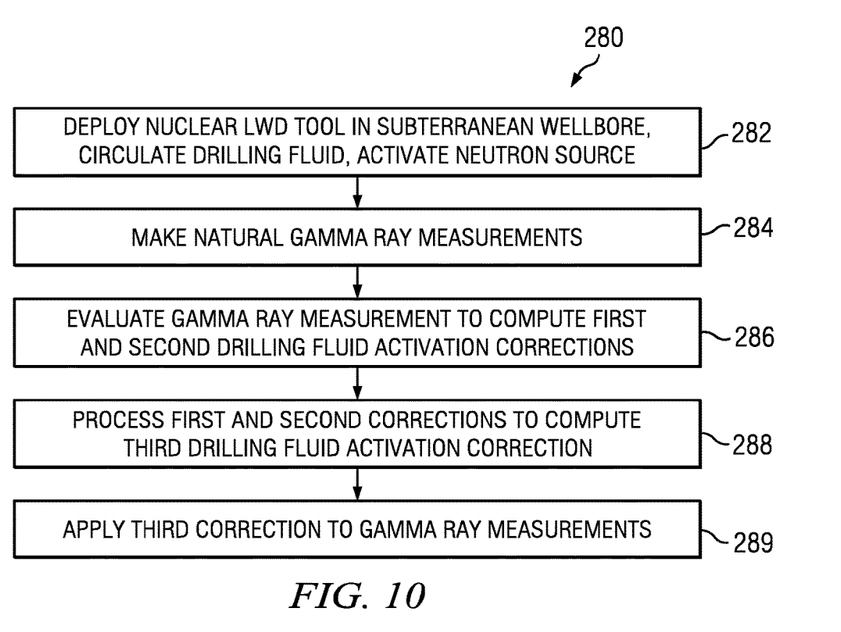
FIG. 10 depicts a flow chart of still another disclosed method embodiment.

FIG. 10 depicts a flow chart of still another disclosed method embodiment 280 for making natural gamma ray measurements of a subterranean formation. Drilling fluid is circulated through a logging while drilling string (or tool) deployed in a subterranean wellbore at 282. As noted in the previous embodiments, the logging while drilling string includes at least a neutron source and a natural gamma ray sensor. The gamma ray sensor is used to make a spectral gamma ray measurement, for example, while the neutron source emits neutrons at 284. The gamma ray measurements are evaluated at 286 to compute first and second drilling fluid activation corrections using corresponding first and second correction methodologies, for example, as described above in methods 200 and 250 (FIGS. 6 and 8). The first and second drilling fluid activation corrections are processed at 288 to compute a third drilling fluid activation correction which is in turn applied to the gamma ray measurements at 289 to compute a corrected total natural gamma ray measurement.

With continued reference to FIG. 10, it will be understood that the third drilling fluid correction may be computed by processing a weighted average of the first and second drilling fluid corrections, for example, as disclosed in method 200 (FIG. 6). It will be further understood that the first drilling fluid activation correction may include a gamma ray count above a predetermined energy threshold and that the second drilling fluid activation correction may include first and second oxygen activation counts from a fit of first and second oxygen activation energy spectra corresponding to oxygen activation gamma rays emitted by activated drilling fluid circulating inside and outside the logging tool to the gamma ray measurements. In such an embodiment, the first and second oxygen activation counts may be processed to compute a modified R value which may be further processed in combination with the gamma ray count above the predetermined energy threshold to compute the third drilling fluid activation correction, for example, as disclosed in method 250 (FIG. 8).

With continued reference to FIGS. 6-9, it will be appreciated that the spectral gamma ray measurements may be made over substantially any suitable number of energy windows. In certain embodiments a measured gamma ray spectrum may include a small number of broad energy windows, for example from about three to about five windows. In other embodiments the measured gamma ray spectrum may include a larger number of fine energy channels, for example including 128 or more channels. The disclosed embodiments are not limited in this regard.

With reference again to FIGS. 2A and 2B, it will be appreciated that a mandrel based gamma ray sensor (as depicted on FIG. 2A) is generally more sensitive to down flow activation and less sensitive to up flow activation (as the gamma ray sensor is in closer proximity to the downwardly flowing drilling fluid). A chassis based gamma ray sensor (as depicted on FIG. 2B) is generally more sensitive to up flow activation and less sensitive to down flow activation (as the gamma ray sensor is in closer proximity to the upwardly flowing drilling fluid and may optionally be shielded from the downwardly flowing fluid). Notwithstanding the above, the disclosed embodiments are intended to be suitable for use with substantially any logging string and gamma ray sensor configuration.

While not depicted in the FIGS., it will be understood that a portion of the disclosed method embodiments may be implemented downhole (e.g., by a downhole controller deployed in the logging string). Moreover, it will be further understood that the aspects and features of the disclosed embodiments may be embodied as logic that may be processed by, for example, a computer, a microprocessor, hardware, firmware, programmable circuitry, or any other processing device known in the art. Similarly the logic may be embodied on software suitable to be executed by a processor, as is also well known in the art. The disclosed embodiments are not limited in any of these regards.

A suitable downhole controller may include, for example, a programmable processor, such as a microprocessor or a microcontroller and processor-readable or computer-readable program code embodying logic. A suitable processor may be utilized, for example, to execute a portion of the method embodiments described above with respect to FIGS. 4-10. For example, a downhole controller may be configured to process gamma ray measurements to compute total natural gamma ray formation activity of the subterranean formation. The formation activity may be optionally transmitted to the surface while drilling (e.g., via known telemetry techniques).

A suitable controller may be further configured to control operation of the natural gamma ray sensor(s) and the neutron generator(s). A suitable controller may also optionally include other controllable components, such as data storage devices, power supplies, timers, and the like and may optionally communicate with other instruments in the drill string, for example, including telemetry systems that communicate with the surface. A suitable controller may further optionally include volatile or non-volatile memory or a data storage device for storing measured gamma ray spectra for further post-processing.

Although a method for making natural gamma ray logging measurements and certain advantages thereof have been described in detail, it should be understood that various changes, substitutions and alternations can be made herein without departing from the spirit and scope of the disclosure as defined by the appended claims.

What is claimed is:

1. A method for making natural gamma ray measurements of a subterranean formation, the method comprising:
   (a) circulating drilling fluid through a logging while drilling string deployed in a subterranean wellbore, the logging while drilling string including a neutron source and a natural gamma ray sensor;
   (b) causing the neutron source to emit neutrons while circulating in (a);
   (c) causing the natural gamma ray sensor to acquire a spectral gamma ray measurement while the neutron source emits neutrons in (b);
   (d) fitting the gamma ray measurement made in (c) to standard spectra to determine a total drilling fluid activation count, at least one of the standard spectra being an oxygen activation spectrum;
   (e) processing the total drilling fluid activation count to compute a first drilling fluid activation correction in a first time interval;
   (f) processing a count of the gamma ray measurement above at least one predetermined energy threshold to compute a second drilling fluid activation correction in a second time interval;
   (g) processing a weighted average of the first drilling fluid activation correction and the second drilling fluid activation correction to computing a third drilling fluid activation correction; and
   (h) applying the third drilling fluid activation correction to the gamma ray measurement to obtain a corrected total natural gamma ray measurement.

2. The method of claim 1, further comprising
   (i) evaluating the corrected total natural gamma ray measurement to provide well to well correlation of formation layers within a field, to distinguish between shale and radioactively clean layers, to identify formation lithology, and/or to estimate a volume of shale present in the formation.

3. The method of claim 1, wherein the weighted average comprises a weighting function that is dependent on the formation activity.

4. The method of claim 3, wherein the weighting function is selected adaptively based on gamma ray counts measured in (c).

5. The method of claim 1, wherein the first time interval is longer than the second time interval.

6. The method of claim 1, wherein the first, second, and third drilling fluid activation corrections are computed acquisition frame by acquisition frame of the gamma ray measurement made in (c).

7. The method of claim 6, wherein the first time interval is a first measurement window about the acquisition frame and the second time interval is a second measurement window about the acquisition frame.

8. The method of claim 1, wherein the fitting in (d) comprises fitting the gamma ray measurement to at least five standard spectra including thorium, uranium, and potassium natural gamma ray spectra and first and second oxygen activation spectra representative of activation from drilling fluid inside the sting and outside the string.

9. The method of claim 1, wherein a length of at least one of the first time interval and the second time interval is determined adaptively based on gamma ray counts measured in (c).

10. A method for making natural gamma ray measurements of a subterranean formation, the method comprising:
   (a) circulating drilling fluid through a logging while drilling string deployed in a subterranean wellbore, the logging while drilling string including a neutron source and a natural gamma ray sensor;
   (b) causing the neutron source to emit neutrons while circulating in (a)
   (c) causing the natural gamma ray sensor to acquire a spectral gamma ray measurement while the neutron source emits neutrons in (b);
   (d) evaluating the gamma ray measurement over a first accumulation interval to extract (i) a total gamma ray count and (ii) a gamma ray count above a predetermined energy threshold;
   (e) evaluating the gamma ray measurement over a second accumulation interval to fit the gamma ray measurement to standard spectra including at least first and second oxygen activation spectra corresponding to oxygen activation gamma rays emitted by activated drilling fluid circulating inside and outside the logging tool;
   (f) computing first and second oxygen activation counts from said fit in (e), the first and second oxygen activation counts corresponding to the oxygen activation gamma rays emitted by activated drilling fluid circulating inside and outside the logging tool;
   (g) processing the first and second oxygen activation counts computed in (f) to compute a modified R value, wherein the modified R value is computed as a weighted average of first and second R values corresponding to R values for the activated drilling fluid circulating inside the logging while drilling tool and outside the logging while drilling tool, where the first R value is a ratio of a total number of gamma rays induced by the activated drilling fluid circulating inside the logging while drilling tool to the gamma ray count above a predetermined energy threshold in the second accumulation interval, and the second R value is a ratio of a total number of gamma rays induced by the activated drilling fluid circulating outside the logging while drilling tool to the gamma ray count above the predetermined energy threshold in the second accumulation interval;
   (h) processing (i) the total gamma ray count and (ii) the gamma ray count above the predetermined energy threshold extracted in (d) in combination with the modified R value to compute an oxygen activation correction; and
   (i) applying the oxygen activation correction to the gamma ray measurement to obtain a corrected gamma ray measurement.

11. The method of claim 10, further comprising
   (j) evaluating the corrected total natural gamma ray measurement to provide well to well correlation of formation layers within a field, to distinguish between shale and radioactively clean layers, to identify formation lithology, and/or to estimate a volume of shale present in the formation.

12. The method of claim 10, wherein the first and second R values are obtained based on laboratory measurements or modeling results.

13. The method of claim 10, wherein the modified R value is computed according to the following equation:

$$R_{mod} = R_{in} \frac{Y_{in}}{Y_{in} + Y_{out}} + R_{out} \frac{Y_{out}}{Y_{in} + Y_{out}}$$

wherein $R_{mod}$ represents the modified R value, $R_{in}$ and $R_{out}$ represent the first and second R values, and $Y_{in}$ and $Y_{out}$ represent the first and second oxygen activation counts computed in (f).

14. The method of claim 10, wherein said evaluating in (e) comprises fitting the gamma ray measurement to at least five standard spectra including thorium, uranium, and potassium natural gamma ray spectra and the first and second oxygen activation spectra.

15. The method of claim 10, wherein the first accumulation interval is longer than the second accumulation interval.

16. The method of claim 10, wherein a length of at least one of the first accumulation interval and the second accumulation interval is determined adaptively based on gamma ray counts measured in (c).

17. A method for making natural gamma ray measurements of a subterranean formation, the method comprising:
   (a) circulating drilling fluid through a logging while drilling string deployed in a subterranean wellbore, the logging while drilling string including a neutron source and a natural gamma ray sensor;
   (b) causing the natural gamma ray sensor to acquire a spectral gamma ray measurement;
   (c) evaluating the gamma ray measurements acquired in (b) to compute first and second drilling fluid activation corrections using corresponding first and second correction methodologies;
   (d) processing the first and second drilling fluid activation corrections to compute a third drilling fluid activation correction; and
   (e) applying the third drilling fluid activation correction to the gamma ray measurements made in (b) to compute a corrected total natural gamma ray measurement.

18. The method of claim 17, wherein the processing in (d) comprises computing a weighted average of the first and second drilling fluid activation corrections to compute the third drilling fluid activation correction.

19. The method of claim 17, wherein:
   the first gamma ray drilling fluid activation correction comprises a gamma ray count above a predetermined energy threshold; and
   the second drilling fluid activation correction comprises first and second oxygen activation counts from a fit of the gamma ray measurement made in (b) to first and second oxygen activation energy spectra corresponding to oxygen activation gamma rays emitted by activated drilling fluid circulating inside and outside the logging tool.

* * * * *